(12) United States Patent
Fukuizumi et al.

(10) Patent No.: US 7,406,722 B2
(45) Date of Patent: Aug. 5, 2008

(54) AUTOMATIC FAUCET FOR LAVATORY UNIT OF AIRCRAFT

(75) Inventors: Masahito Fukuizumi, Tokyo (JP); Tatsuya Yamaguchi, Tokyo (JP)

(73) Assignee: Jamco Corporation, Tokyo (JP)

( * ) Notice: Subject to any disclaimer, the term of this patent is extended or adjusted under 35 U.S.C. 154(b) by 496 days.

(21) Appl. No.: 11/254,751

(22) Filed: Oct. 21, 2005

(65) Prior Publication Data

US 2006/0150316 A1 Jul. 13, 2006

(30) Foreign Application Priority Data

Jan. 7, 2005 (JP) .............................. 2005-002009

(51) Int. Cl.
*E03C 1/05* (2006.01)
(52) U.S. Cl. .............................. 4/623; 4/675; D23/238
(58) Field of Classification Search ............... 4/623, 4/675–678; D23/215, 222, 238–242; 137/801
See application file for complete search history.

(56) References Cited

U.S. PATENT DOCUMENTS

| | | | |
|---|---|---|---|
| 4,398,310 A | | 8/1983 | Lienhard et al. |
| 4,767,922 A | * | 8/1988 | Stauffer ....................... 250/221 |
| 5,222,672 A | * | 6/1993 | Hart et al. ................. 239/553.5 |
| 5,611,093 A | * | 3/1997 | Barnum et al. .................. 4/624 |
| 5,765,242 A | * | 6/1998 | Marciano ........................ 4/623 |
| 5,781,942 A | * | 7/1998 | Allen et al. ..................... 4/623 |
| 6,125,482 A | | 10/2000 | Foster et al. |
| D533,629 S | * | 12/2006 | Lammel ..................... D23/238 |

| | | | |
|---|---|---|---|
| 2004/0227034 A1 | | 11/2004 | Wentland et al. |

FOREIGN PATENT DOCUMENTS

| | | |
|---|---|---|
| DE | 200 17 254 U1 | 3/2001 |
| FR | 2 253 884 A | 7/1975 |
| WO | WO 96/41058 A | 12/1996 |

OTHER PUBLICATIONS

European Search Report dated Apr. 11, 2006 issued in corresponding European Patent Application No. 05022310.6.

* cited by examiner

*Primary Examiner*—Charles E Phillips
(74) *Attorney, Agent, or Firm*—Westerman, Hattori, Daniels & Adrian, L.L.P.

(57) ABSTRACT

The invention provides an improved automatic faucet for a lavatory unit of an aircraft. A body 110 of an automatic faucet 100 has on its lower left side (seen from the front) a liquid soap dispenser outlet 200, and the dispenser outlet 200 is connected to a liquid soap dispenser tank via a valve not shown. A reflective infrared sensor 210 for the liquid soap dispenser outlet and an LED light 230 for the liquid soap dispenser outlet are provided adjacent to the liquid soap dispenser outlet 200. When a user's hand is placed within the area of infrared waves 220, a predetermined amount of liquid soap is supplied over the user's hand. The LED light 230 is turned on to illuminate the user's hand. A water supply outlet 300 is provided at the lower right side of the body 110, which is connected to a water tank via a valve not shown. A reflective infrared sensor 310 for the water supply outlet and an LED light 330 for the water supply outlet are provided adjacent to the water supply outlet 300. When the user's hand is placed within the area of infrared waves 320, a predetermined amount of water is supplied over the user's hand. The LED light 330 is turned on to illuminate the user's hand.

2 Claims, 5 Drawing Sheets

AUTOMATIC FAUCET FOR LAVATORY UNIT OF AIRCRAFT

The present application is based on and claims priority of Japanese patent application No. 2005-2009 filed on Jan. 7, 2005, the entire contents of which are hereby incorporated by reference.

BACKGROUND OF THE INVENTION

1. Field of the Invention

The present invention relates to an automatic faucet disposed inside a lavatory unit of an aircraft.

2. Description of the Related Art

In a lavatory unit of an aircraft, it is inefficient to have a faucet equipment and a liquid soap dispenser disposed separately around the very small wash basin, and it is also unsanitary to have the two equipments spaced apart since the soapy water dripping from the user's hand makes a mess around the wash basin.

The present invention aims at solving the problems of the prior art.

In private commercial aircrafts, the space inside the aircraft such as the passenger cabin is a very important mounting space that generates profit, so they prioritize most in maximizing the mounting of the cabin or cargo in order to ensure profit. Therefore, spaces such as the lavatory unit that do not directly generate profit are normally minimized. On the other hand, the lavatory unit of an aircraft is used by unspecified number of people, so in order to ensure that the lavatory is sanitary, it must include facilities equivalent to those of a lavatory on the ground which must be disposed within the very small space inside the lavatory. There is a faucet equipment and a liquid soap dispenser disposed around the very small wash basin, but they take up too much space on the already incapacious wash stand, are not very user-friendly, and block the user's view from confirming the washing status of the hands.

Further, since the prior art faucet is difficult to clean up, it may not be possible to ensure a sanitary condition. Even further, since according to the prior art faucet the water temperature is difficult to confirm, the user may be injured by the hot water supplied through the faucet if the prior user of the lavatory has set the temperature too high.

Moreover, since there are a number of protruded objects disposed around the washbasin, when the aircraft receives impact due to turbulence or the like, which occurs quite often during normal flight of the aircraft, the passenger using the faucet may smash his/her hands or face suddenly against the faucet and be injured.

SUMMARY OF THE INVENTION

The present invention aims at providing an automatic faucet that solves the problems of the prior art mentioned above.

The automatic faucet according to the present invention comprises an automatic faucet body having a semi-annular planar shape and attached to a wall surface in front of a wash basin, a liquid soap dispenser outlet disposed on a bottom left side of the automatic faucet body, a reflective infrared sensor for the liquid soap dispenser outlet, an LED light for the liquid soap dispenser outlet, a water supply outlet disposed on a bottom right side of the automatic faucet body, a reflective infrared sensor for the water supply outlet, an LED light for the water supply outlet, and a water temperature adjustment dial attached to a right end side of the automatic faucet body.

The water temperature adjustment dial comprises an illumination means that changes color tone in response to the temperature of the water being supplied.

According to the above-mentioned arrangement, water or soap water can be fed without touching the faucet.

Moreover, since the hand of the user is illuminated while the water or liquid soap is supplied, the user can confirm the washing status easily.

Further, the LED light indicating the water temperature enables the user to visually confirm the status of the water temperature.

DETAILED DESCRIPTION OF THE PREFERRED EMBODIMENTS

Figure 1:
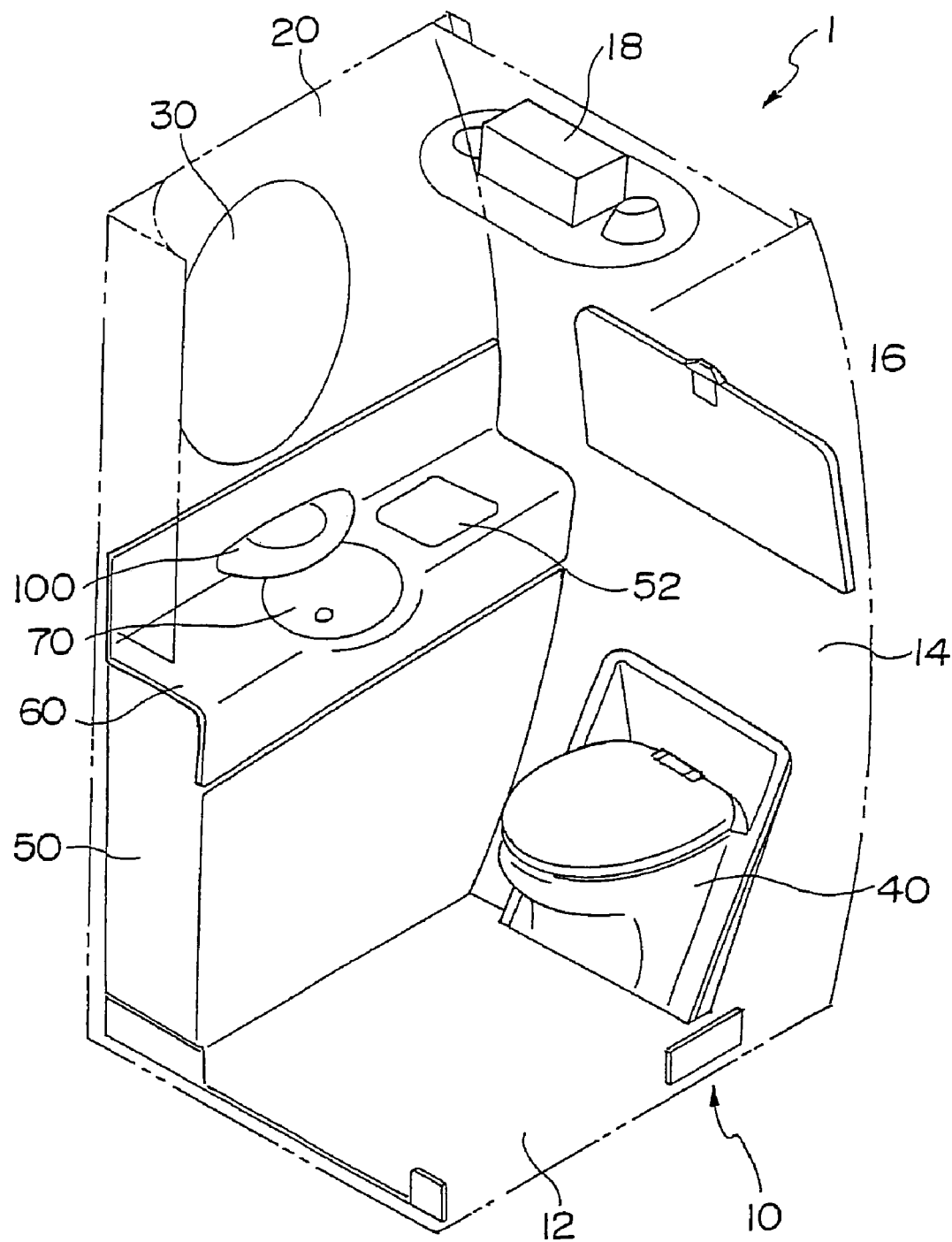
FIG. 1 is an explanatory view showing the general structure of a lavatory unit of an aircraft.

FIG. 1 is an explanatory view showing the general structure of a lavatory unit of an aircraft to which the present invention is applied.

The lavatory unit denoted as a whole by reference number 1 has a lavatory body 10 formed for example of honeycomb panels.

The lavatory body 10 is formed of a bottom panel 12, a side panel 14 and the like, and has a retractable table 16 and an illumination device 18.

A lavatory bowl 40 and a housing 50 storing a dust box and the like are disposed inside the lavatory body 10. A wash stand 60 is provided on the upper portion of the casing 50, and a wash basin 70 is disposed at the center of the wash stand 60.

A door 52 through which trash is thrown in is attached to the upper surface of the wash stand 60.

A mirror 30 is attached to a wall panel 20 in front of the wash stand 60.

The automatic faucet 100 for a lavatory unit of an aircraft according to the present invention is disposed on an upper portion of a wash basin 70.

Figure 2:
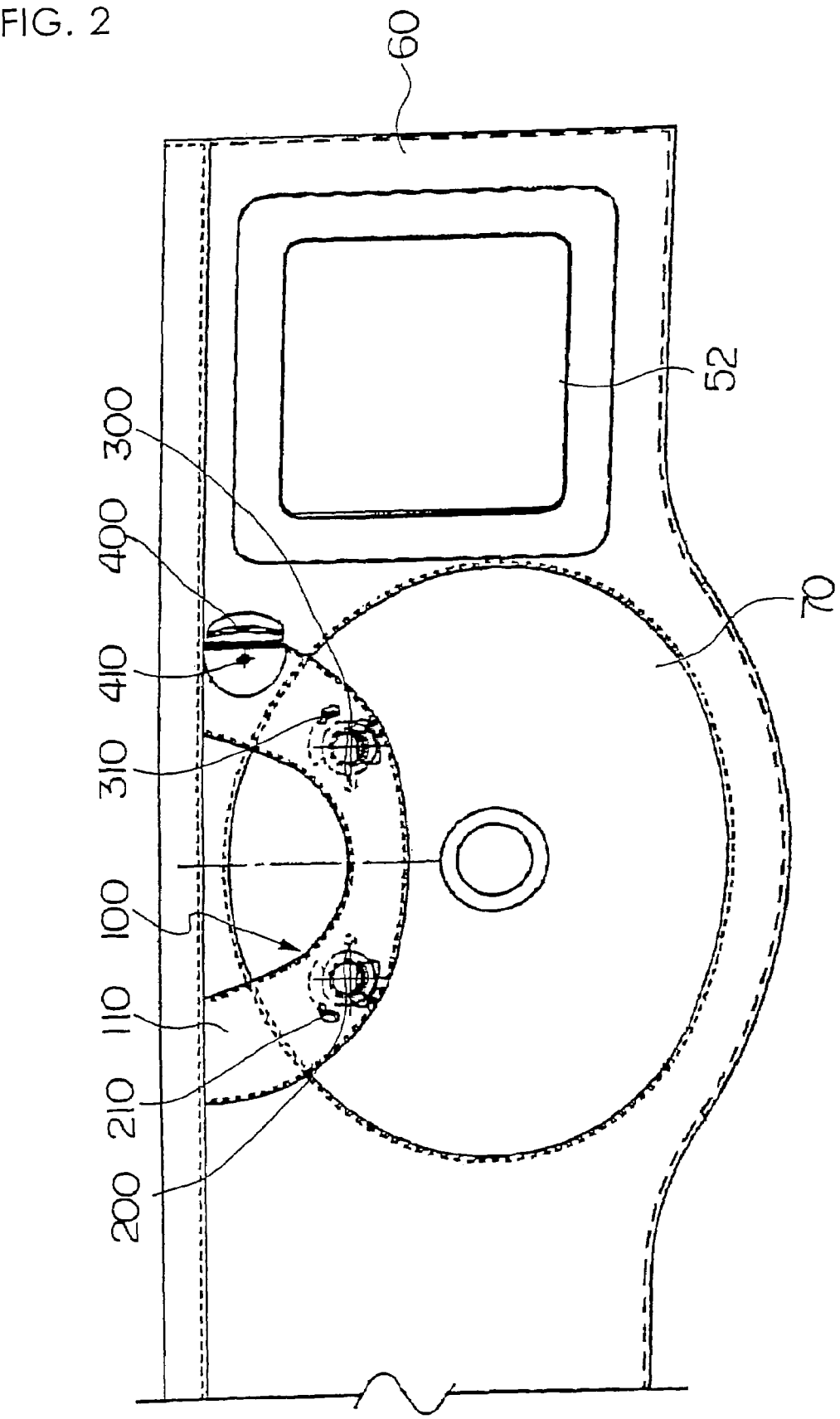
FIG. 2 is an upper view of an automatic faucet for a lavatory unit of an aircraft.
Figure 3:
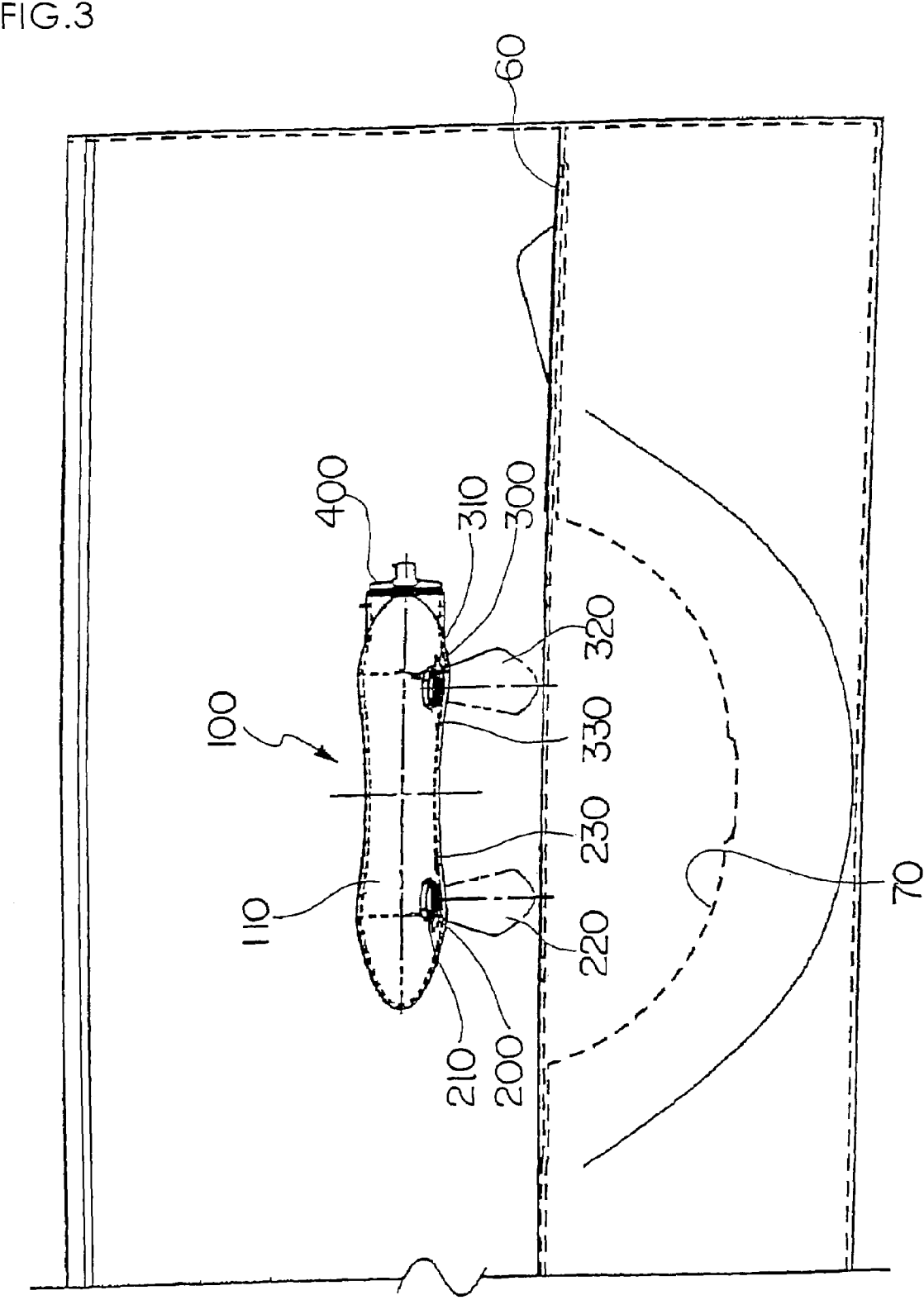
FIG. 3 is a front view of an automatic faucet for a lavatory unit of an aircraft.

FIG. 2 is an upper view of the automatic faucet 100 for a lavatory unit of an aircraft, and FIG. 3 is a front view thereof.

The automatic faucet 100 for a lavatory unit of an aircraft has a body 110 formed by molding synthetic resin or metal. The body 110 has a planar shape that looks like an annular member cut substantially in half.

The body 110 has a liquid soap dispenser outlet 200 provided on the bottom left side when seen from the front side, and the dispenser outlet 200 is connected to a liquid soap dispenser tank via a valve not shown.

A reflective infrared sensor 210 for the liquid soap dispenser outlet and an LED light 230 for the liquid soap dispenser outlet are provided adjacent to the liquid soap dispenser 200.

Infrared waves are projected to the area denoted by reference number 220 from the reflective infrared sensor 210 for the liquid soap dispenser outlet, and when the hand of a user enters this range of infrared waves 220, a control unit not shown opens the valve and supplies a predetermined amount of liquid soap onto the user's hand. At this time, the LED light 230 for the liquid soap dispenser outlet is turned on to illuminate the user's hand.

A water supply outlet 300 is disposed on the bottom right side of the body 110, which is connected to a water tank via a valve not shown.

A reflective infrared sensor 310 for the water supply outlet and an LED light 330 for the water supply outlet are provided adjacent to the water supply outlet 300.

Infrared waves are projected to the area denoted by reference number 320 from the reflective infrared sensor 310 for the water outlet, and when the hand of a user enters this range of infrared waves 320, a control unit not shown opens the valve and supplies a predetermined amount of water on the user's hand.

At this time, the LED light 330 for the water outlet is turned on to illuminate the user's hand.

A water temperature adjustment dial 400 is provided at the right side end of the body 110. The user can adjust the temperature of the water supplied through the water supply outlet 300 by rotating the temperature adjustment dial 400.

An LED light for indicating the water temperature is provided near the temperature adjustment dial, and when the water temperature is low, for example, a blue colored LED is turned on, and when it is hot, a red colored LED is turned on. When the temperature is in the middle, the light intensity of the blue LED and the red LED are changed to vary the color tone gradually.

According to this function, the user can visually confirm the water temperature.

Figure 4:
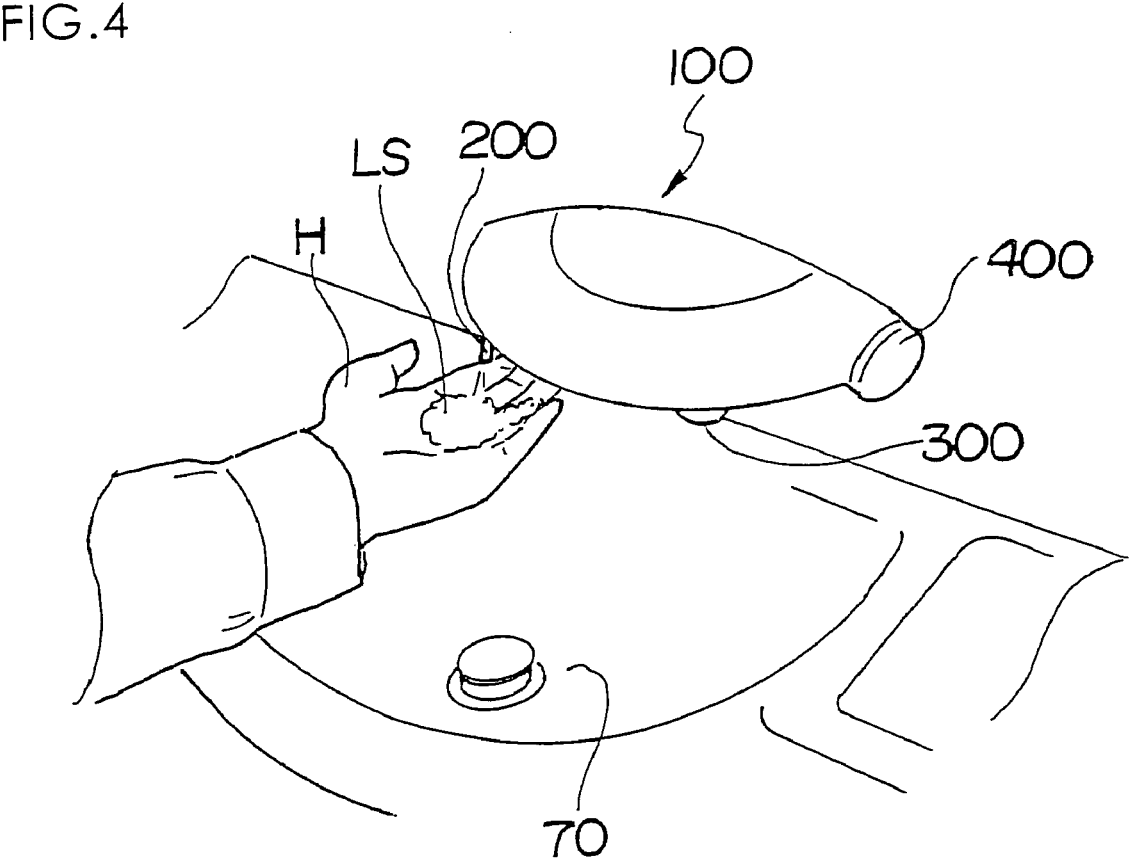
FIG. 4 is an explanatory view showing the status of use of the automatic faucet for a lavatory unit of an aircraft.
Figure 5:
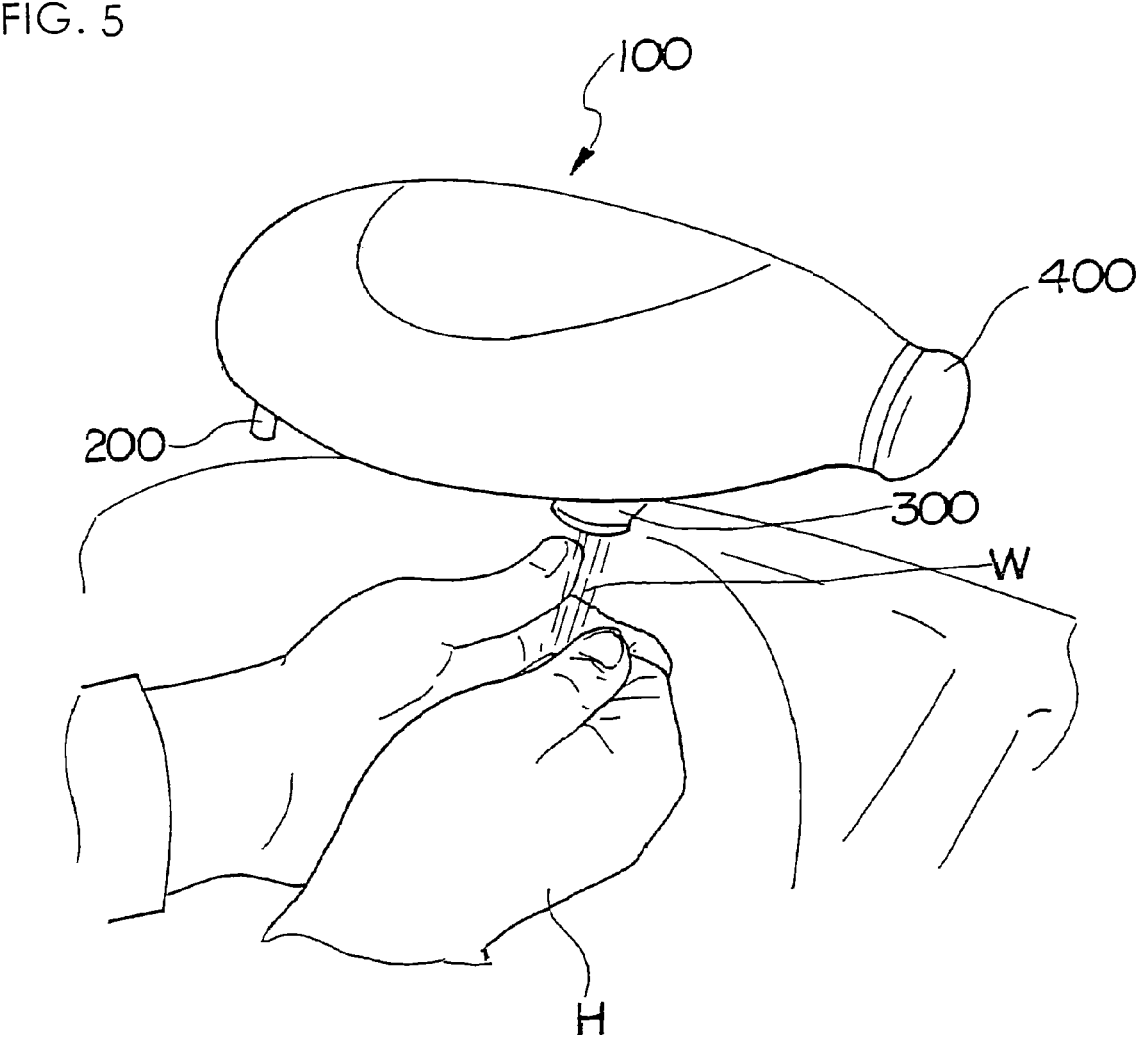
FIG. 5 is an explanatory view showing the status of use of the automatic faucet for a lavatory unit of an aircraft.

FIGS. 4 and 5 are explanatory views showing the status of use of the automatic faucet 100 for a lavatory unit of an aircraft according to the present invention.

In FIG. 4, when the user places his/her hand H under the liquid soap dispenser outlet 200, a predetermined amount of liquid soap LS is fed through the liquid soap dispenser outlet 200. At this time, the LED light is turned on to illuminate the area around the hand H.

In FIG. 5, when the user places his/her hand H under the water supply outlet 300, a predetermined amount of water W is fed through the water supply outlet 300. At this time, the LED light is turned on to illuminate the area around the hand H. An LED light for indicating the water temperature is disposed near the temperature adjustment dial 400, which is illuminated with a color tone corresponding to the temperature of the water being fed, enabling the user to visually confirm the water temperature by the color tone.

As described, the automatic faucet for a lavatory unit of an aircraft according to the present invention has a faucet and a liquid soap dispenser provided integrally, which have automatic valves that open and close by infrared sensors, and which is attached to the wall surface so as to enable efficient use of the space around the wash basin.

Furthermore, LED lights are provided near the water supply outlet and the liquid soap dispenser outlet, respectively, so as to illuminate the area near the hands during supply of water and liquid soap.

In addition, an LED light for indicating water temperature is disposed near the temperature adjustment dial, and by changing the color of the LED light from blue (corresponding to cold) to red (corresponding to hot), the status of the water temperature can be confirmed visually.

Projected objects such as levers are eliminated as much as possible, and a cover composed of a smooth connected curved surface is provided in order to facilitate cleaning, ensure a sanitary status, and reduce accidental injuries caused by turbulence and the like.

Furthermore, by integrating the faucet body, cover and mounting seat which are normally disposed individually, the total weight of the equipment can be reduced, which is one of the major issues in an aircraft.

What is claimed is:

1. An automatic faucet for a lavatory unit of an aircraft comprising:
    an automatic faucet body having a semi-annular planar shape and attached to a wall surface in front of a wash basin;
    a liquid soap dispenser outlet disposed on a bottom left side of the automatic faucet body;
    a reflective infrared sensor for the liquid soap dispenser outlet;
    an LED light for the liquid soap dispenser outlet;
    a water supply outlet disposed on a bottom right side of the automatic faucet body;
    a reflective infrared sensor for the water supply outlet;
    an LED light for the water supply outlet; and
    a water temperature adjustment dial attached to a right end side of the automatic faucet body.

2. The automatic faucet for a lavatory unit of an aircraft according to claim 1, wherein the water temperature adjustment dial has an illumination means that changes color tone in response to the temperature of the water being supplied.

\* \* \* \* \*